United States Patent [19]

Flinchbaugh

[11] Patent Number: 4,703,426
[45] Date of Patent: Oct. 27, 1987

[54] METHOD AND APPARATUS FOR REVIEWING AND MODIFYING HORIZONS OF A THREE-DIMENSIONAL SEISMIC VOLUME

[75] Inventor: Bruce E. Flinchbaugh, Dallas, Tex.

[73] Assignee: Texas Instruments Incorporated, Dallas, Tex.

[21] Appl. No.: 669,503

[22] Filed: Nov. 8, 1984

[51] Int. Cl.⁴ .............................................. G01V 1/00
[52] U.S. Cl. ..................................... 364/421; 367/38; 367/72
[58] Field of Search .................. 364/421, 806; 367/38, 367/40, 43, 63, 47, 73, 72

[56] References Cited

U.S. PATENT DOCUMENTS

| | | | |
|---|---|---|---|
| 4,203,161 | 5/1980 | Johnson et al. | 364/421 |
| 4,204,279 | 5/1980 | Parrack et al. | 364/421 |
| 4,298,968 | 11/1981 | Ruehle et al. | 364/421 |

Primary Examiner—E. A. Goldberg
Assistant Examiner—Lincoln Donovan
Attorney, Agent, or Firm—Thomas G. Devine; James T. Comfort; Melvin Sharp

[57] ABSTRACT

A computer system reviews and modifies horizons tentatively defined by a network of pairs of turnings. The curvature for each of the paths of turnings of the network in both the X and Y directions is assessed. If the curvature exceeds a predetermined value in any of the paths, that path is terminated at the point of excessive curvature. Also, each pair of turnings is tested to determine whether it is in a closed loop made up of four turnings which in turn make up four pairs of turnings to determine that there is three-dimensional continuity. The horizons are thereby modified if modification is required.

26 Claims, 19 Drawing Figures

METHOD AND APPARATUS FOR REVIEWING AND MODIFYING HORIZONS OF A THREE-DIMENSIONAL SEISMIC VOLUME

BACKGROUND OF THE INVENTION

1. Field of the Invention

This invention relates to the analysis of seismic data and more particularly to a system for reviewing and modifying horizons tentatively defined for a three-dimensional seismic volume.

2. Description of the Prior Art

Human seismic interpreters generally seem to pick horizons that are consistent with a criterion of locally low curvature. They also seem to pick horizons that are consistent with a criterion of three-dimensional continuity by way of "tying" seismic events around a mesh of lines and cross-lines in seismic data prospects. No previous automated procedure has been used for measuring low curvature and continuity and modifying on the basis of such measurement.

BRIEF SUMMARY OF THE INVENTION

A computer system reviews and modifies horizons of a three-dimensional seismic volume that have been tentatively defined by a network of turnings. Turnings describe zero-crossings of the Nth derivative of a waveform. The tentatively identified horizon is assessed for excessive curvature. That is, each path of turnings in the X direction of the network and each path in the Y direction of the network is assessed for curvature exceeding a predetermined limit.

The manner in which the curvature is assessed is described by the following example.

Let Ti, Tj and Tk be three successive turnings in the X direction.

Let (xi, ti), (xj, tj) and (xk, tk) be the positions of the three turnings, respectively.

Then $m1 = (tj - ti)/(xj - xi)$ and $m2 = (tk - tj)/(xk - xj)$.

If the absolute value of $m1 - m2$ is greater than the low curvature threshold, then the pairings (Ti, Tj) and (Tj, Tk) are eliminated.

Each of the horizons are tested for three-dimensional continuity. This criterion is best explained by the following example:

Let T1 and T2 be sets of turnings such that T1 contains the turnings from one seismic trace and T2 contains the turnings from an adjacent seismic trace in any direction within the seismic date volume. Let a closed loop of turnings be an ordered list of at least three turnings, (t0, t1, t2, . . . ,tn), such that the ti are distinct and the following pairs exists:

(t0, t1), (t1, t2), . . . (tn−1, tn), (tn, t0). Then t1 in T1 and t2 in T2 may only form a pair when a closed loop of turnings exists that includes t1 and t2.

The object of this invention is to assure that the curvature of a tentative horizon is not too extreme and that the horizon is three-dimensionally continuous. This and other objects will be made evident in the detailed description that follows.

DETAILED DESCRIPTION OF THE INVENTION

Three dimensional seismic data is collected typically through the use of vibrators for land data collection and air guns for sea data collection. In either event, the data is collected, processed, and presented as a three-dimensional volume formed of digitized traces. The traces are represented as a series of points, each point being described digitally. By examining the series of points for significant seismic events and by interrelating significant events between traces, three dimensional horizons may be developed.

The processed three-dimensional seismic data sections traditionally have been interpreted by human experts. A tedious and time-consuming task that the interpreter must perform is to pick seismic events through the volume and to map the time and amplitude structure of the events. This invention addresses the problems of automatically picking and mapping three-dimensional seismic event horizons.

Figure 1A:
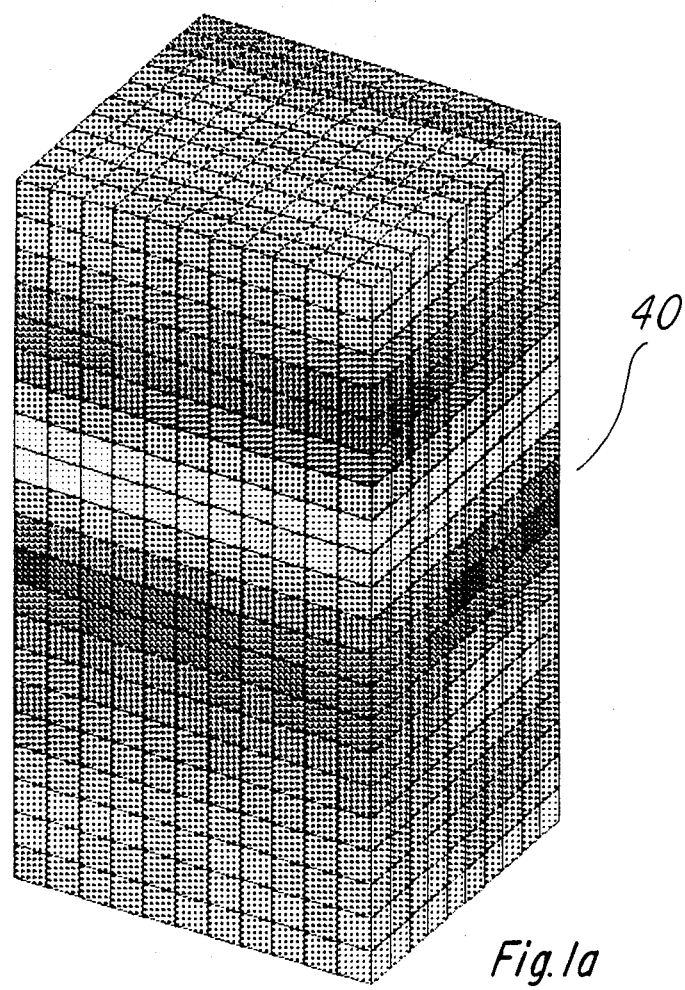
FIG. 1A illustrates a three-dimensional volume of seismic data.

FIG. 1A illustrates a typical processed three-dimensional seismic data volume 40. The gradations in shade are generally proportional to changes in amplitude of the seismic signal returned as a result of a seismic source such as a vibrator or air gun having been activated.

Figure 1B:
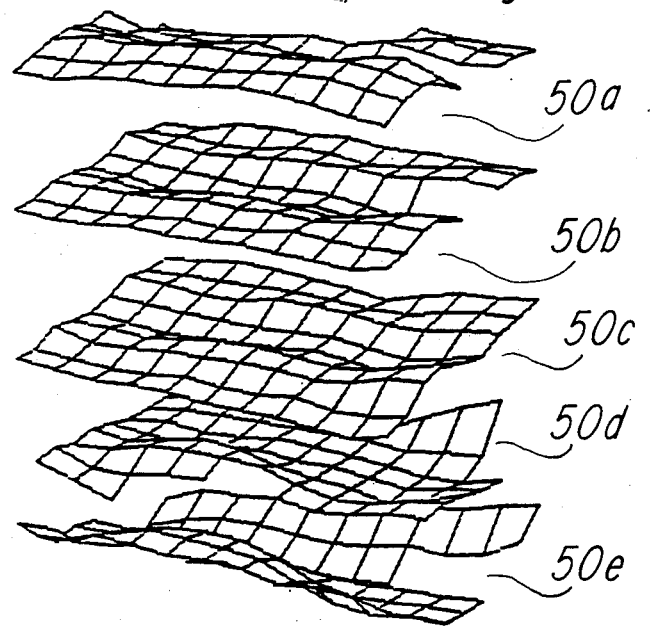
FIG. 1B illustrates three-dimensional horizons produced from the volume of FIG. 1A, using the method and apparatus of this invention.

FIG. 1B indicates typical three-dimensional horizons 50a–50e that lie within three-dimensional seismic volume 40 where time is the vertical dimension. These horizons are the end result of this invention and may be displayed as shown on paper, or may be displayed in the face of a cathode ray tube, or any other display apparatus. The horizons may be viewed from any direction, of course, and other information about the horizon, such as the seismic amplitudes on the surface, may also be displayed. Horizon, in the strict geophysical sense, means "geological interface". As used in this invention, horizon means "interpreter's sketch of a surface through seismic data." The wavelengths of the source typically imparted into the earth in seismic exploration are of such a magnitude as to preclude the detection of all "geological interfaces". Therefore, the horizons that are referred to in this specification are surfaces in the three-dimensional seismic volume 40 that are estimated to be everywhere locally parallel to the "geologic interfaces".

The automatic production of the horizons 50a–50e is accomplished in four steps:

Step 1: Determine and describe significant points of change along each seismic trace.

Step 2: Determine pairs of turnings such that the turnings within pairs lie on the same three-dimensional seismic event.

Step 3: Determine seismic event surfaces (horizons).

Step 4: Produce physical maps of the seismic event surfaces (horizons).

Figure 2:
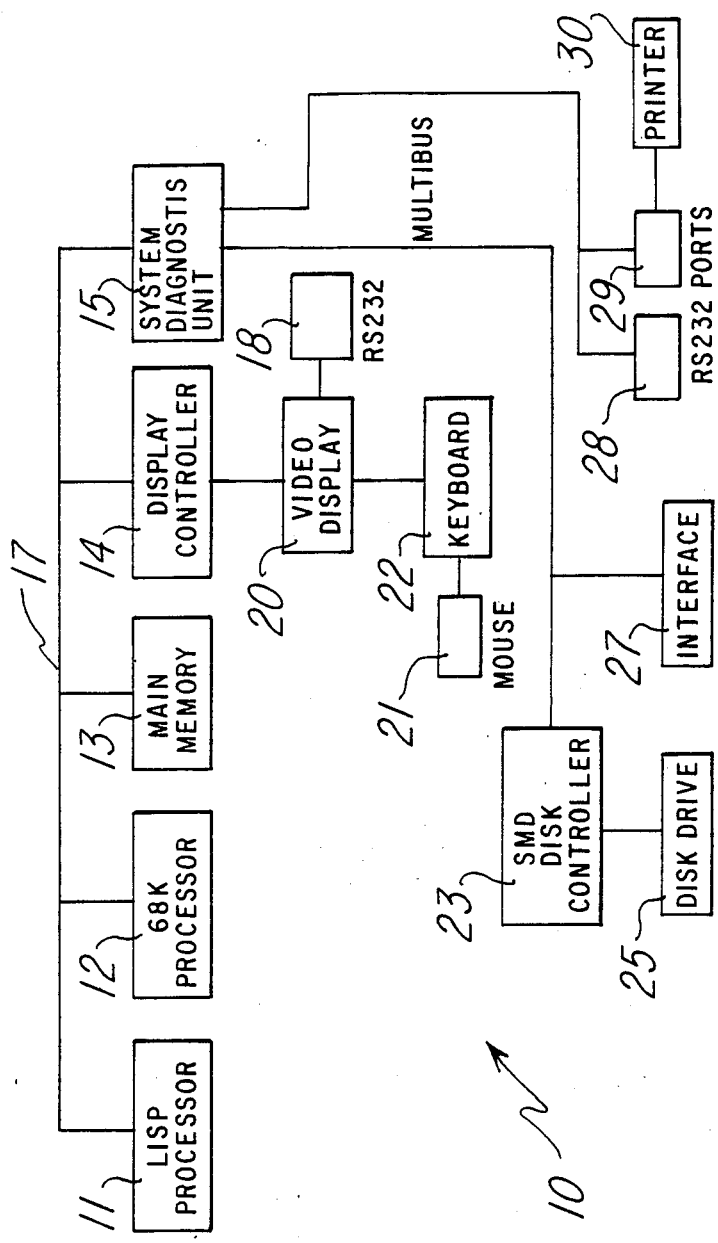
FIG. 2 is a block diagram of the computer system of this invention.

FIG. 2 illustrates the LISP machine of this invention, a LAMBDA machine made by LISP Machines, Inc. The LAMBDA system and the use of the LISP programs in the Appendix, are set out in detail in the following manuals of LISP Machine, Inc.:

"Introduction to the LISP System"—1983
"ZMACS-Introductory Manual"—1983
"ZMAIL Manual"—April 1983;
"Window System Manual"—August 1983;
"Lisp Machine Manual"—January 1983;
"System 94 Release Notes"—Undated In block form, a LISP processor 11 is connected via bus 17 (a Texas Instruments NuBus TM type bus) to a Motorola 68000 processor 12, main memory 13, display controller 14 and system diagnostic unit 15. Display controller 14 controls video display 20 which is connected to RS232 interface 18. The video display 20 may be used for displaying the representation of the three-dimensional section 40 and for the display of the horizons 50a–50e. Keyboard 22 and mouse 21 are connected to video display 20 for interaction therewith. SMD disk controller 23 controls disk drive 25 which is used for storage as is main memory 13. Printer 30 is connected to RS232 port 29 which in turn is connected through the system diagnostic unit 15 to LISP processor 11, main memory 13 and SMD disk controller 23. The printer 30 is therefore accessible to a storage unit for receiving a representation of the horizons 50a–50d for printing hard copies of the desired images.

Figure 3:
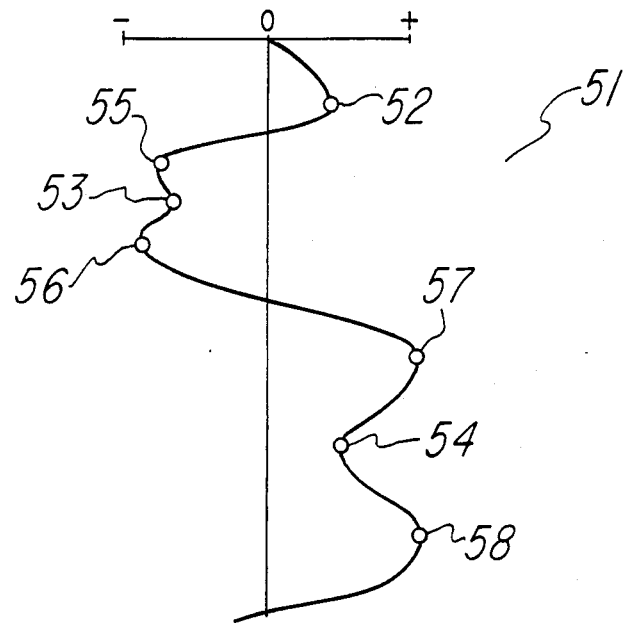
FIG. 3 illustrates a typical trace is analog form.

Turning now to FIG. 3, Step 1 as carried out by system 10 will be described. For the purpose of description, each significant point of change along a seismic trace is a turning. The description of a turning includes its position in the volume, the amplitude of the seismic trace at that position, and its sign (negative or positive). Trace 51 is represented in an analog manner. Points 52–58 represent turning points in the case where turnings are defined by zero-crossings in the first derivative. In fact, trace 51 is represented by a series of digital numbers. Each number signifies an amplitude. Turning points 52, 54, 57 and 58 have positive amplitudes and points 53, 55, 56 have negative amplitudes. However, the signs of the turning are determined by the (N+1)th derivative of the trace and therefore the sign of turnings 54, 55 and 56 are positive while the sign of turning points 52, 53, 57 and 58 are negative. The turning points are determined using zero-crossings in the Nth derivative. The turnings have the advantage of distinctly marking significant changes such as local extrema, saddle points, inflections and other high-order changes. This is in contrast to prior art methods of looking at the zero crossings of the original trace as significant. Exactly which changes are marked can be controlled by varying the value of N, a parameter of step 1. The derivative at each sample point, t0, is approximated as follows:

1. Let t−, t0, and t+ be the times of three consecutive sample points.

2. Let A(t) be the amplitude of the trace at time t.

3. Then the derivative, D, of the trace at t0 is computed by:

$$D(t0) = (A(t+) - A(t-))/2$$

This approximation for computing the derivative is derived from the parabola P, passing through (t−, A(t−)), (t0, A(t0)), and (t+, A(t+)). D(t0) is the slope of P at t0. The solution is simple because the sample points are regularly spaced at unit intervals, allowing the following property of parabolas to be exploited:

Theorem: Let $P(x) = AX^2 + BX + C$. Then the derivative of P at a value half way between two values, v and w, is the slope of the line through (v, P(v)) and (w, P(w)). That is:

$$P'((v+w)/2) = (P(w) - P(v))/(w - v).$$

Higher order-derivatives are computed by iterative applications of the scheme for calculating the derivative as shown above.

Figure 6A:
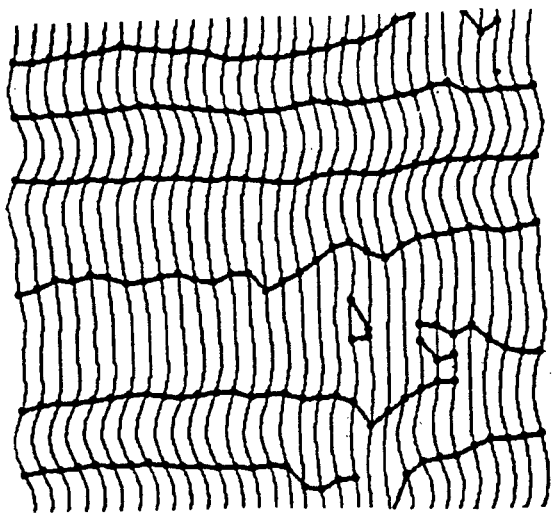
FIGS. 6A, 6B, 6C, 6D, 6E, 6F, 6G and 6H illustrate traces and indicate horizons determined from zeros of successive derivatives taken with N=0 at FIG. 6A and N=7 at FIG. 6H.
Figure 6B:
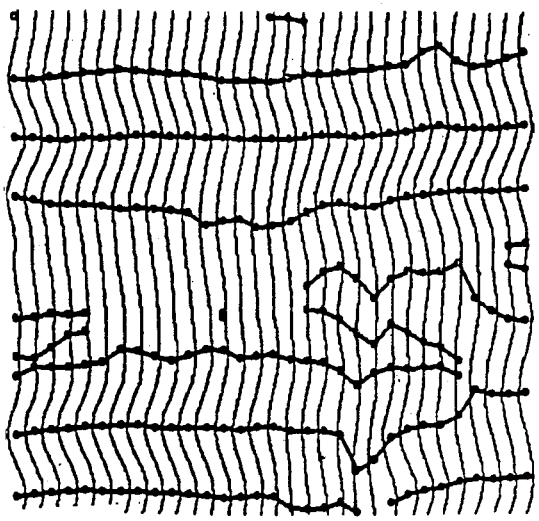
Figure 6C:
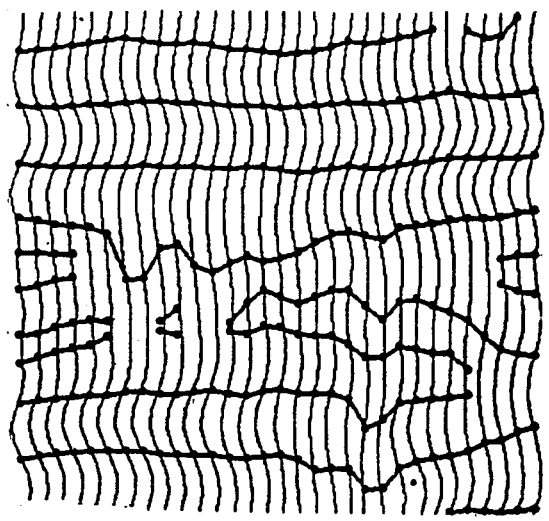
Figure 6D:
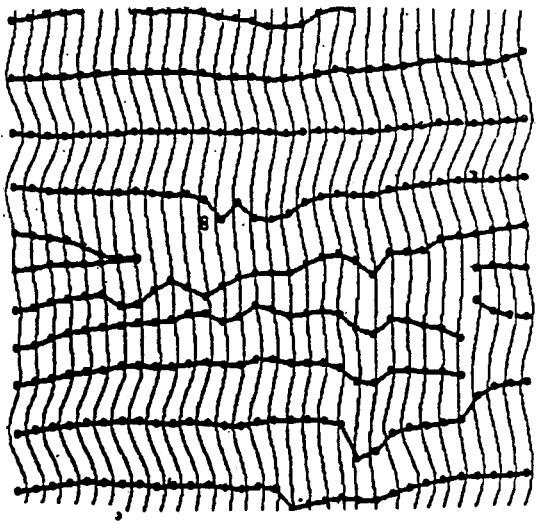
Figure 6E:
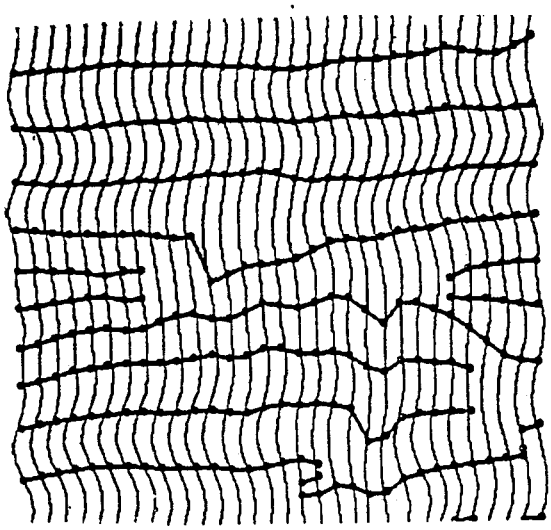
Figure 6F:
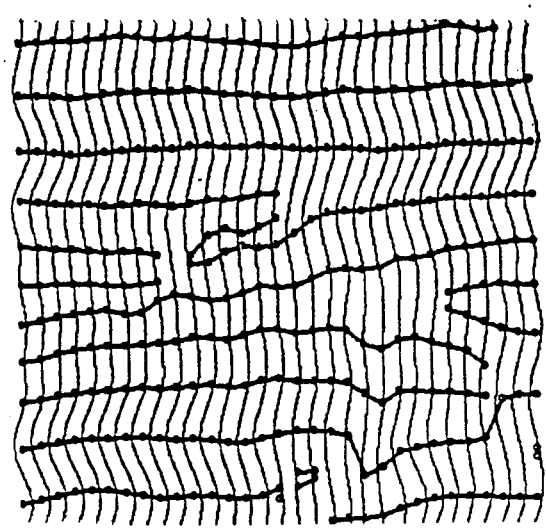
Figure 6G:
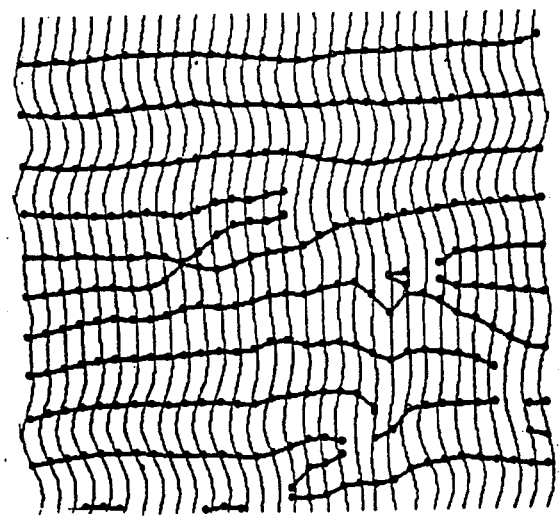
Figure 6H:
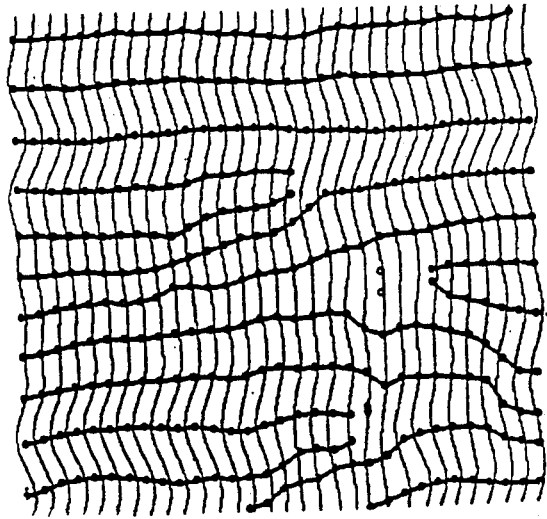

In principle, the first derivative defines turnings at local extrema and saddles of the seismic trace. The first derivative therefore captures attributes of an important turning point quite well. The second derivative defines turnings at inflections and straight segments of the trace. In that case, the term "turning" is somewhat of a misnomer, but the inflections may serve just as well or better than the local extrema and saddles for a given trace. As N becomes larger, smoother and more complete three-dimensional horizons are produced. In practice, N=7 has the advantage of marking changes or mapping that are ordinarily not noticed by human inspection. This may be seen by an inspection of FIGS. 6A–6H where FIG. 6A illustrates traces with N=0. FIG. 6B illustrates N=1, FIG. 6C illustrates N=2, and so on with FIG. 6H illustrating N=7. The implementation of this step 1 may be seen in the appendix beginning on Page 2 thereof under the title "STEP 1: DETERMINE TURNING POINTS".

By specifying only those points that are turning points in the Nth derivative, data compaction is accomplished. Of course, a variety of other techniques, including frequency domain filters, may be employed to approximate the derivatives.

Figure 4:
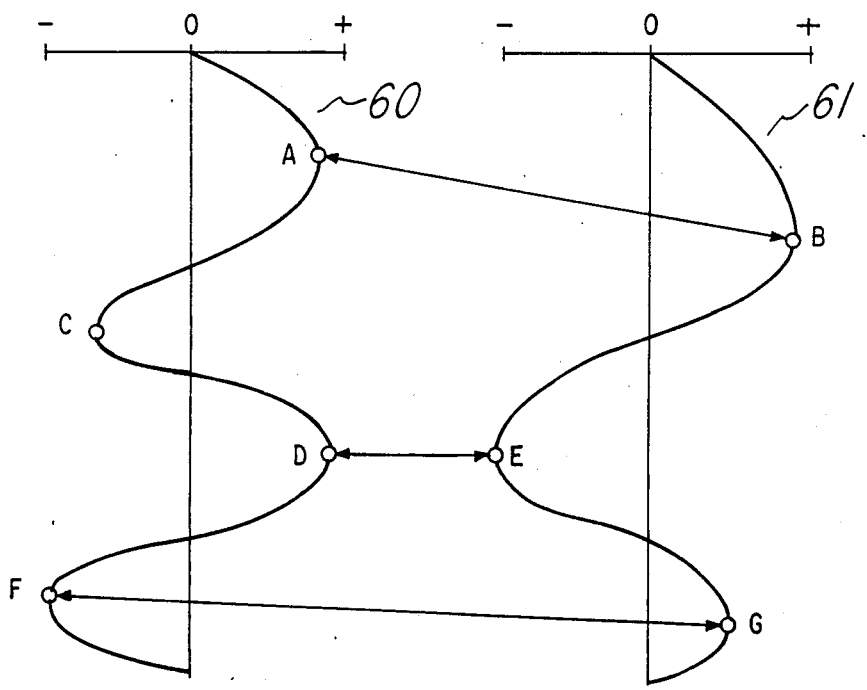
FIG. 4 illustrates two analog traces in the application of the mutual nearest neighbor criterion.

FIG. 4 illustrates traces 60 and 61 having the mutual nearest neighbor criterion applied. The mutual nearest neighbor criterion was originally devised and used for solving problems in computer vision as set out in the Ph. D dissertation "A Computational Theory of Spatio-Temporal Aggregation for Visual Analysis of Objects in Dynamic Environments" by Bruce E. Flinchbaugh, The Ohio State University, June 1980.

This mutual nearest neighbor criterion has been applied in the past to seismic interpretation relating to two dimensional seismic sections. This prior art technique involved the two-dimensional lineation of wavelets. Wavelets are defined as that portion of a wiggle trace between amplitude zero-crossings when N=0. A lineation refers to a two-dimensional horizon in a 2-D seismic section. However, a technique is applied herein for the first time to a three-dimensional volume 40. That is, the mutual nearest neighbor criterion is applied in the X direction and in the Y direction to each and every turning using Nth derivative of every trace making up the three-dimensional volume 40.

In FIG. 4, turning point A is shown connecting to turning point B. That is, the nearest neighbor to point A of trace 60 in trace 61 is point B. Likewise, the nearest neighbor to point D of trace 60 is point E of trace 61. The nearest neighbor to point F of trace 60 is point G of trace 61. In a similar manner, the nearest neighbor to point B of trace 61 is point A of trace 60. The nearest neighbor of point E of trace 61 is point D of trace 60. The nearest neighbor to point G of trace 61 is point F of trace 60. The nearest neighbor of point C of trace 60 is point B of trace 61, but because point B's nearest neighbor is not point C, point C does not have a mutual nearest neighbor, thus point C is not paired with any turning. It should be noted that while these traces are shown in a 2-D analog representation, the mutual nearest neighbor is based only on the time dimension which is the vertical dimension as shown in FIG. 4.

Turning point D has been paired with turning point E. Turning point E has a radically different character from turning point D because its (N+1)th derivative is positive while turning point D's is negative. Likewise, turning point G's (N+1)th derivative is negative while turning point F's is positive.

Figure 5:
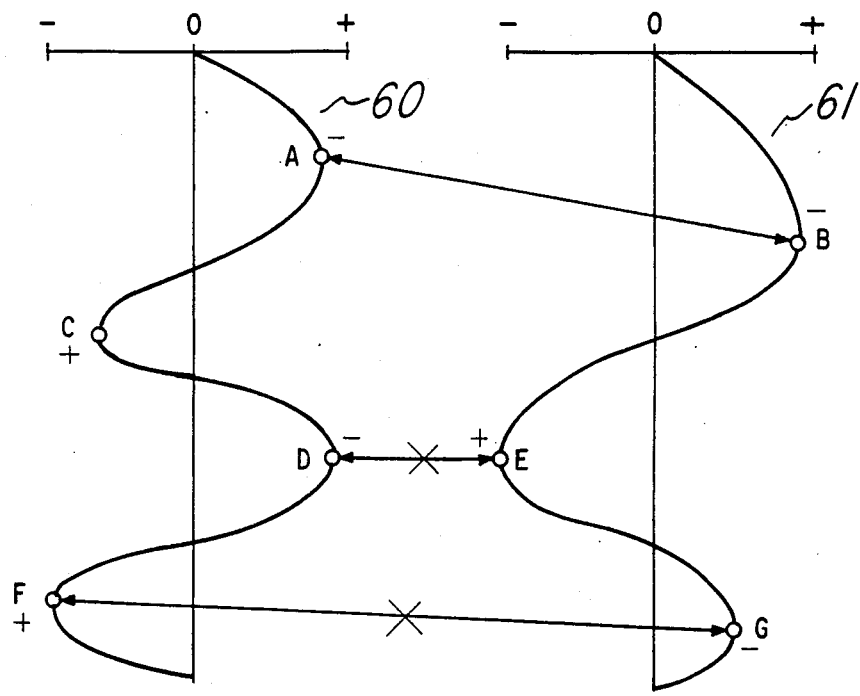
FIG. 5 is a reproduction of FIG. 4 except that the effect of also requiring like signs is illustrated.

FIG. 5 illustrates that turning points D and E may not be linked nor may turning points F and G. This prohibition against such links is made based on the assumption that the character of a three-dimensional seismic horizon, as represented by the sign of the turning cannot change radically between adjacent traces. Therefore, the criterion is that the signs must be homogeneous. The implementation of the mutual nearest neighbor and homogeneous signs criteria may be seen in the appendix on page 3 under the heading "STEP 2: DETERMINE PAIRS OF TURNINGS ON THE SAME HORIZON", extending to page 6 to the heading "APPLY-LOW-CURVATURE-CRITERION".

Each turning point, through this implementation, has now been identified as being paired with up to four other turnings, one in each of the four directions from the turning (the positive and negative X and Y directions).

Figure 7:
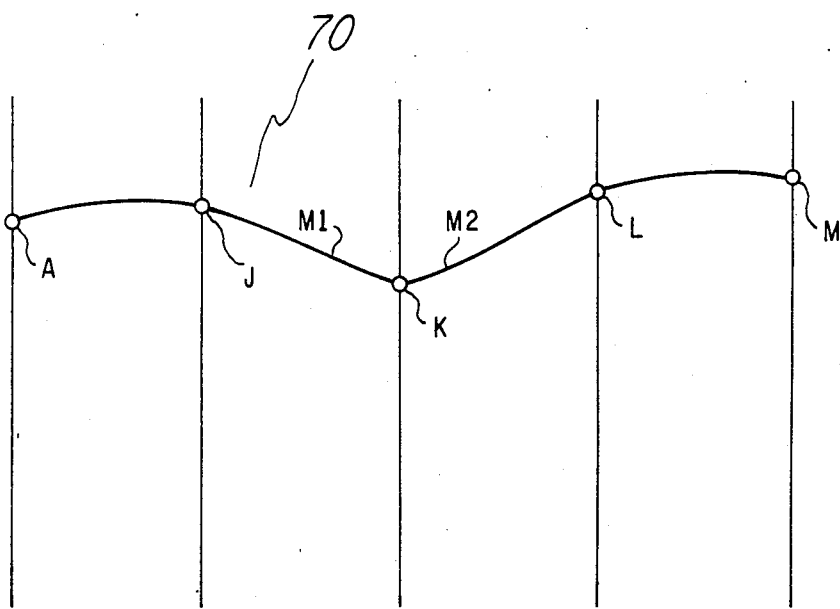
FIG. 7 illustrates the low curvature criterion.

As a part of Step 2, the curvature of the path formed by the paired turnings in successive digital traces is assessed in both the X and Y directions. In FIG. 7 line segments are drawn between paired turnings to represent path 70 through turnings A, J, K, L, and M. The curvature of the path at K is assessed by considering the slope, m1, of the segment between J and K, and the slope, m2, of the segment between K and L. If m1 and m2 differ by more than a predetermined value, the path 70 is "cut" at K by eliminating the pairs (J, K) and (K, L). The predetermined value is a parameter of the method. In other words, a pair can only occur when the curvature of the path through the turnings of the pair, together with the turnings of an incident pair in the same direction, is less than a maximum curvature. Restricting pairs of turnings in this manner helps to rule out implausible three-dimensional seismic horizons. The implementation of the low curvature criterion may be studied in the Appendix beginning at page 6 under the heading "APPLY-LOW-CURVATURE-CRITERION".

Step 2 also includes a requirement of three-dimensional continuity. This criterion requires that a pair can only occur wherever the pair is a link in a closed loop of turnings. Restricting pairs of turnings in this manner helps to assure that pairs are on seismic events that have three-dimensional extent as a horizon. This criterion is based on the assumption that if two turnings lie on a three-dimensional seismic event, then other turnings lying on the same event surface are nearby. Specifically, this criterion is described as follows:

Let T1 and T2 be sets of turnings such that T1 contains the turnings from one seismic trace and T2 contains the turnings from an adjacent trace in any direction within the seismic data section. Let a closed loop of turnings be an ordered list of at least three turnings, (t0, t1, t2, ... tn), such that the ti are distinct and the following pairs exist:

((t0, t1), (t1, t2) ... (tn−1, tn), tn, t0)). Then t1 in T1 and t2 in T2 may only form a pair when a closed loop of turnings exists that include t1 and t2.

Figure 8A:
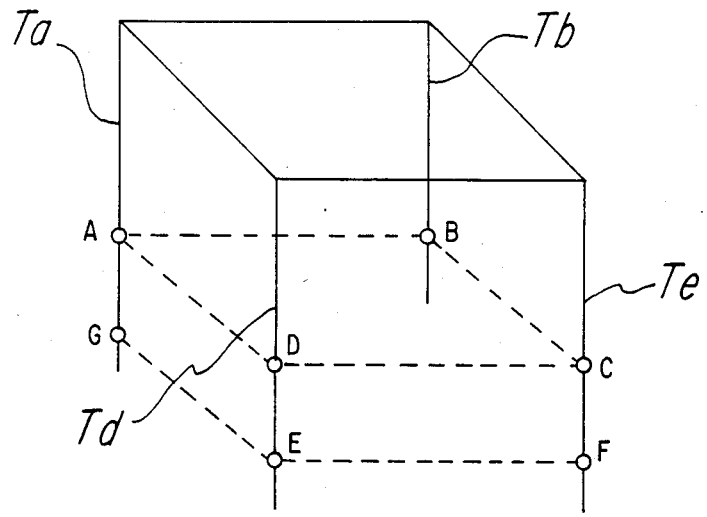
FIG. 8A illustrates 3-D continuity of four turnings forming four pairs of turnings.
Figure 8B:
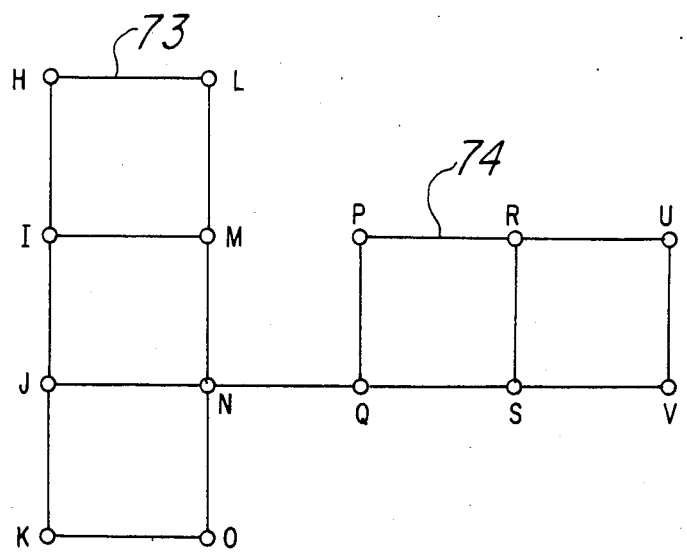
FIG. 8B, from a top view, illustrates 3-D continuity.

Closed loops spanning just a few (e.g., four) traces in closely spaced three-dimensional seismic data can be assumed to bound a region of a surface that intersects those traces. Reference to FIGS. 8A and 8B should now be made where, in FIG. 8A, four traces Ta, Tb, Tc and Td are shown. Turning point pairs (A, B) (B, C) (C, D) AND (D, A) are shown forming a closed loop. The four turning points, A–D, form four pairs of turnings as indicated and also form a closed loop. On the other hand, pairs of turnings (G, E) and (E, F) do not form a closed loop and therefore do not define any surface.

A top view of a closed loop concept is shown in FIG. 8B. It can be seen that areas connected together as areas of four turnings forming four pairs of turnings in a closed loop configuration. However, the pairs of turnings (N, Q) (M, N) (P, Q) and (M, P) do not form a closed loop. That is, there is no pairing between turning points M and P. Therefore, the pairing (N, Q) is removed and only distinct horizons 73 and 74 are determined. As may be seen in the Appendix beginning on page 7 under "APPLY-3-D-CONTINUITY-CRITERION". In that implementation, four turnings forming four pairs of turnings provide three-dimensional continuity. A pair that does not satisfy the criterion is "isolated" and rejected.

Figure 10:
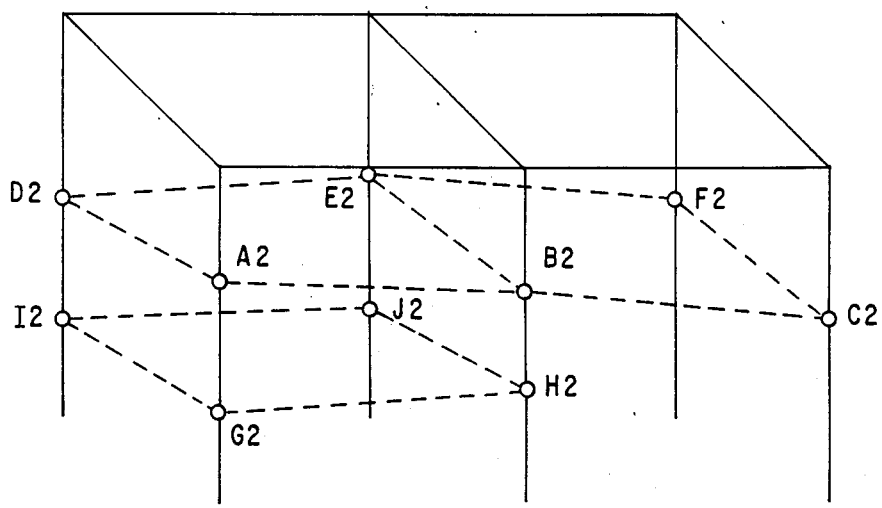
FIG. 10 illustrates transitivity of the pair relation to reformat to the array format.

After Steps 1 and 2 are completed, the horizons have been determined within the three-dimensional volume 40. To fully identify the horizon, however, entry is made at one of the turning points defining that horizon and then all of the remaining turning points that are directly or indirectly connected to the entry turning point are collected. Reference should be made to FIG. 10 to illustrate the criterion as a part of step 3. Turning point D2 is paired with turning point A2 which in turn is paired with turning point B2 which in turn is paired with turning point C2. Therefore, turning points C2 and D2 are in the same horizon. The horizon occurs therefore wherever turnings in a collection are related (directly or indirectly) by pairs. This criterion allows explicit determination of the informational content and three-dimensional extent of horizons.

This criterion is described as follows: Let the relation (pair) (ti, tj), indicate that ti and tj are turnings of the same horizon. This relation is transitive. t1 and t3 belong to the same horizon when pair (t1, t2) and pair (t2, t3) belong to the horizon, because pair (t1, t3) is implied. The transitive property is used to complete the pair relation. The specific implementation may be studied in the Appendix beginning on page 7 under "STEP 3: EXTRACT HORIZONS". This reformatting results in an array format. The array format is appropriate for use in the printer 30 and video display 20 of FIG. 2 for displaying the recommended horizons.

Also, it may be that one horizon is connected to another horizon. Step 3 eliminates connections between horizons. A horizon can contain only turnings such that no turnings are positioned with one directly above the other. This criterion prevents spiraling horizons and assists in determining separate horizons as follows:

Let the horizontal position of a turning, ti, be (xi, yi). Then turnings t1 and t2 can only be part of the same horizon if (x1, y1) is not (x2, y2), i.e., if at most one turning of the horizon lies in any given trace in the volume 40. Thus, each turning of a horizon is guaranteed to be "vertically unique". Implementation of vertical uniqueness is shown in the Appendix, on page 8 under "ADD-TURNING-TO-HORIZON".

Figure 9:
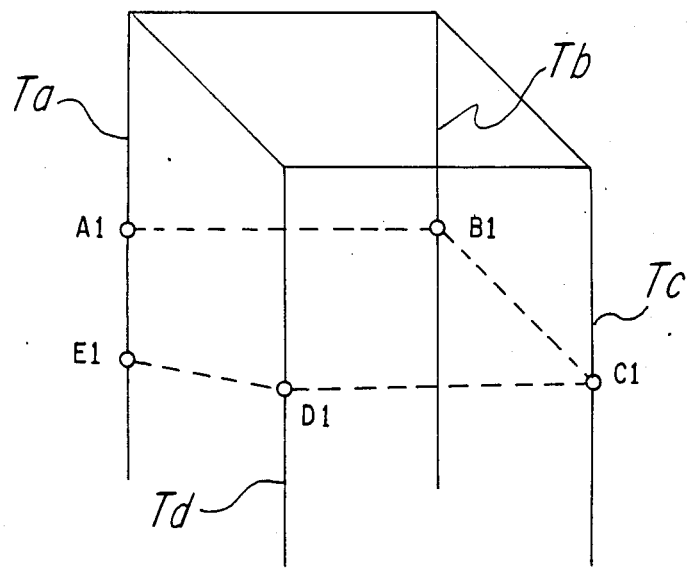
FIG. 9 illustrates vertical uniqueness.

FIG. 9 illustrates the application of this criterion. That is, a complete loop is not achieved because points A1 and E1 appear on the same trace Ta. A collection of turnings of a horizon may include A1 and D1, but turning E1 may not be included in a horizon that includes turning points A1, B1, C1 and D1.

The apparatus for both printing and CRT display are well known, as are the manner in which that apparatus operates. For a specific implementation, please refer to the Appendix beginning at page 8 under "STEP 4; DISPLAY HORIZONS".

While this invention has been described in specific steps and in specific hardware, it is contemplated that those skilled in the art may readily substitute hardware and method steps without departing from the scope of this invention which is limited only by the appended claims.

Appendix

```
; -*- Mode:Lisp; Package:Amos; Base:10. -*-

;AMOS                                              Bruce Flinchbaugh

#|====================================================================
            AMOS:  Automatic Mapping of Seismic Events Terminology The term, Horizon, as used in this program, refers to a surface
computed by the Amos method.  In other documents and implementations
the surfaces are called, variously, Reflector Parallels, Seismic Event
Surfaces, and Seismic Events.  Horizon is used here for simplicity;
the surfaces do not necessarily correspond to actual horizons
(geologic interfaces).
====================================================================|#

(defflavor AMOS
    (
     (Data          nil)   ;3D array of seismic amplitudes, indices:  Time, X, and Y.
     (Dn-Data       nil)   ;3D array, the Nth partial derivative of Data w.r.t. Time.
     (N             1)     ;Integer, the order of the partial derivative in Dn-Data.
     (D             0.5)   ;Number, the maximum allowed local change in horizon dip.
     (Turnings      nil)   ;2D array of lists of Turning Points, indices:  X and Y.
     (Horizons      nil)   ;List of horizons computed by the Amos method.
     (Window  terminal-io) ;Window in which maps of the horizons are displayed.
     (Time-Bins     nil)   ;List of numbers defining bins of Data times for maps.
     (Amplitude-Bins nil)  ;List of numbers defining bins of Data amplitudes.
                           ;The bins are computed during display (Step 4).
     )
    ()
  :settable-instance-variables
  (:documentation
    "The Amos flavor coordinates the Amos method.  To use the method make
an instance, providing the Data array as an Init Option, and send the
instance the :COMPUTE-HORIZONS message.  N, D, and Window are optional
Init Options."))

(defmethod (amos :COMPUTE-HORIZONS) ()
  "Constructs the Horizons representation using the Amos method and
displays maps of the horizons."
  (send self :determine-turning-points)                        ;Step (1).
  (send self :determine-pairs-of-turnings-on-the-same-horizon) ;Step (2).
  (send self :extract-horizons)                                ;Step (2).
  (send self :display-horizons))                               ;Step (4).

#|======================================================================
                    TURNING POINT REPRESENTATION
========================================================================|#

(defflavor TURNING
    (
```

```
    (X         0)    ;Integer, the X coordinate of the location in Dn-Data.
    (Y         0)    ;Integer, the Y coordinate.
    (Time      0.0)  ;Number, the interpolated time of the zero-crossing.
    (Amplitude 0.0)  ;Number, the interpolated amplitude.
    (Sign      0)    ;Number, the sign (+/-1) of the partial of Dn-Data at Time.
    (Nt+       nil)  ;Nearest neighboring turnings in the Time directions (+/-).
    (Nt-       nil)
    (Nx+       nil)  ;Nearest neighboring turnings of the same horizon in the
    (Nx-       nil)  ;X and Y directions (+/-).  Initially each is just the
    (Ny+       nil)  ;nearest neighboring turning on the adjacent trace; at the
    (Ny-       nil)  ;end of Step (2) they connect only paired turnings.
    (Horizon   nil)  ;Array representing the horizon, if any, of this turning.
  )
  ()
  :settable-instance-variables
  (:init-keywords (:specification))
  (:documentation
   "The Turning flavor represents a Turning Point in the Amos method.
    The Specification Init Option, (Time Data Dn-Data), specifies that
    a turning occurs on the trace between Time and Time+1.  Amplitudes
    interpolated for the turnings are used when displaying horizons."))

(defmethod (turning :AFTER :INIT) (init-options)
  "Initializes the Time, Amplitude, and Sign of the turning."
  (let* ((t1 (first (get init-options :specification)))
         (data (second (get init-options :specification)))
         (dn-data (third (get init-options :specification)))
         (t2 (+ t1 1))
         (v1 (aref dn-data X Y t1))   ;Nth partials at t1 and t2.
         (v2 (aref dn-data X Y t2))
         (a1 (aref data X Y t1))      ;Amplitudes at t1 and t2.
         (a2 (aref data X Y t2)))
    (setq Time (// (- (* (- v2 v1) t2) v2) (- v2 v1))
          Amplitude (let ((m (// (- a2 a1) (- t2 t1))))
                     (+ (* m Time) (- a2 (* m t2))))
          Sign (if (> v2 v1) 1 -1))))

#|======================================================================
                STEP 1:  DETERMINE TURNING POINTS
========================================================================|#

(defmethod (amos :DETERMINE-TURNING-POINTS) ()
  "Constructs the Turnings representation."
  (send self :compute-nth-partial-derivative-of-data)
  (send self :mark-zero-crossings-in-nth-derivative))

(defmethod (amos :COMPUTE-NTH-PARTIAL-DERIVATIVE-OF-DATA) ()
  "Computes the nth partial derivative of Data with respect to Time, leaving
   the result in Dn-Data."
  (setq Dn-Data (make-array (array-dimensions Data) :type :art-q))
  (copy-array-contents Data Dn-Data)  ;Dn-Data is just Data in case N = 0.
  (loop with data* = (make-array (array-dimensions Data) :type :art-q)
        repeat N do
        (copy-array-contents Dn-Data data*)
        (send self :compute-partial-derivative data* Dn-Data)))

(defmethod (amos :COMPUTE-PARTIAL-DERIVATIVE) (data* d1-data*)
  "Computes the partial derivative of DATA* with respect to Time, leaving
   the result in D1-DATA*."
  (loop with (xdim ydim tdim) = (array-dimensions data*)
        for x below xdim do
        (loop for y below ydim do
              ;Compute derivatives at times 1 through TDIM - 2:
              (loop for time from 1 to (- tdim 2) do
                    (aset (// (- (aref Data x y (+ time 1))
                                 (aref Data x y (- time 1)))
                              2.0)
                          d1-data* x y time))
              ;Compute derivatives at times 0 and TDIM - 1 (special cases):
              (aset (- (aref Data x y 1) (aref Data x y 0))
                    d1-data* x y 0)
              (aset (- (aref Data x y (- tdim 1)) (aref Data x y (- tdim 2)))
                    d1-data* x y (- tdim 1)))))
```

```
(defmethod (amos :MARK-ZERO-CROSSINGS-IN-NTH-DERIVATIVE) ()
  "Constructs the Turnings representation, creating one Turning for
  each zero-crossing in Dn-Data.  The original implementation of the
  Amos method also created Turnings for zero-touchings; the touchings
  are omitted here for simplicity."
  (loop with (xdim ydim tdim) = (array-dimensions Dn-Data)
        initially (setq Turnings (make-array (list xdim ydim) :type 'art-q))
        for x below xdim do
        (loop for y below ydim do
              (aset (loop ;Check for a turning in each interval, [time,time+1]:
                          for time from 0 to (- tdim 2)
                          for value-at-time = (aref Dn-Data x y time)
                          for value-at-time+1 = (aref Dn-Data x y (+ time 1))
                          if (or (and (plusp value-at-time)
                                      (minusp value-at-time+1))
                                 (and (minusp value-at-time)
                                      (plusp value-at-time+1)))
                            collect (make-instance 'turning :x x :y y
                                      :specification `(,time ,Data ,Dn-Data)))
                    Turnings x y))))

#|================================================================
     STEP 2:   DETERMINE PAIRS OF TURNINGS ON THE SAME HORIZON
=================================================================|#

(defmethod (amos :DETERMINE-PAIRS-OF-TURNINGS-ON-THE-SAME-HORIZON) ()

"Scans the Turnings representation to set the Nx+/- and Ny+/- pointers
  to adjacent turnings of the same horizon."
  (send self :initialize-nearest-neighbors)
  (send self :apply-pairing-criteria))

(defmethod (amos :INITIALIZE-NEAREST-NEIGHBORS) ()
  "Sets the Nt+/-, Nx+/-, and Ny+/- pointers to the nearest neighboring
  turnings in the indicated directions."
  ;Initialize the Nt+/- pointers (these simplify operations later):
  (loop with (xdim ydim) = (array-dimensions Turnings)
        for x below xdim do
        (loop for y below ydim do
              (loop with previous-turning = (first (aref Turnings x y))
                    for current-turning in (cdr (aref Turnings x y)) do
                    (send previous-turning :set-nt+ current-turning)
                    (send current-turning :set-nt- previous-turning)
                    (setq previous-turning current-turning))))
  ;Initialize the Nx+/- pointers:
  (loop with (xdim ydim) = (array-dimensions Turnings)
        for y below ydim do
        (loop for x from 1 below xdim
              for previous-turning-list = (aref Turnings (- x 1) y)
              for current-turning-list = (aref Turnings x y) do
              (send self :initialize-nearest-neighbors-between-two-traces
                    :set-nx+ previous-turning-list current-turning-list)
              (send self :initialize-nearest-neighbors-between-two-traces
                    :set-nx- current-turning-list previous-turning-list)))
  ;Initialize the Ny+/- pointers:
  (loop with (xdim ydim) = (array-dimensions Turnings)
        for x below xdim do
        (loop for y from 1 below ydim
              for previous-turning-list = (aref Turnings x (- y 1))
              for current-turning-list = (aref Turnings x y) do
              (send self :initialize-nearest-neighbors-between-two-traces
                    :set-ny+ previous-turning-list current-turning-list)
              (send self :initialize-nearest-neighbors-between-two-traces
                    :set-ny- current-turning-list previous-turning-list))))

(defmethod (amos :INITIALIZE-NEAREST-NEIGHBORS-BETWEEN-TWO-TRACES)
           (set-n* turning-list-a turning-list-b)
  "Sets the Nx+/- or Ny+/- pointer, as indicated by SET-N* (e.g. :SET-NX+),
  of each turning in the A list to the nearest B list turning."
  (loop for a-turning in turning-list-a
        if (not (null turning-list-b))
          do (loop with previous-b-turning = (first turning-list-b)
                   for current-b-turning in (cdr turning-list-b)
                   until (> (send current-b-turning :time)
                            (send a-turning :time))
```

```
            do (setq previous-b-turning current-b-turning)
            finally
            (if (or (null current-b-turning) ;In case just 1 b-turning.
                    (< (abs (- (send a-turning :time)
                               (send previous-b-turning :time)))
                       (abs (- (send a-turning :time)
                               (send current-b-turning :time)))))
                (send a-turning set-n* previous-b-turning)
                (send a-turning set-n* current-b-turning)))))

(defmethod (amos :APPLY-PAIRING-CRITERIA) ()
  "The four criteria in Step 2 of the Amos method are applied to prune
   and adjust the pointers."
  (send self :apply-mutual-nearest-neighbor-and-homogeneous-signs-criteria)
  (send self :apply-low-curvature-criterion)
  (send self :apply-3d-continuity-criterion))

(defmethod (amos :APPLY-MUTUAL-NEAREST-NEIGHBOR-AND-HOMOGENEOUS-SIGNS-CRITERIA)
           ()
  "Scans all turnings, adjusting pointers according to the MNN and HS
   criteria in all four directions."
  (send self :determine-nearest-neighboring-candidates-with-equal-signs)
  (send self :prune-according-to-mutual-nearest-neighbor-criterion))

(defmethod (amos :DETERMINE-NEAREST-NEIGHBORING-CANDIDATES-WITH-EQUAL-SIGNS) ()
  "Scans all turnings. Each turning votes for the most appropriate pairing,
   according to the MNN and HS criteria, in each direction."
  (loop with (xdim ydim) = (array-dimensions Turnings)
        for x below xdim do
        (loop for y below ydim do
              (loop for turning in (aref Turnings x y) do
                    (send self :vote-for-nearest-equal-sign-candidate
                          turning :nx+ :set-nx+)
                    (send self :vote-for-nearest-equal-sign-candidate
                          turning :nx- :set-nx-)
                    (send self :vote-for-nearest-equal-sign-candidate
                          turning :ny+ :set-ny+)
                    (send self :vote-for-nearest-equal-sign-candidate
                          turning :ny- :set-ny-)))))

(defmethod (amos :VOTE-FOR-NEAREST-EQUAL-SIGN-CANDIDATE) (turning n* set-n*)
  "The N* pointer of TURNING is adjusted to the nearest neighboring turning
   in that direction that agrees in sign.  An additional criterion is applied
   to preserve the property of mutual nearest neighbor pairings that no
   pairings cross; pointers that may result in such a crossing are set to NIL."
  (let ((n*-turning (send turning n*)))
    (if (not (null n*-turning))
        ;If the turnings agree in sign then N* is already the right vote.
        (if (not (= (send turning :sign) (send n*-turning :sign)))
            ;Consider changing N* to the next nearest turning without crossing:
            (if (> (send turning :time) (send n*-turning :time))
                ;TURNING is below N*-TURNING so consider the next lowest one:
                (let ((n*t+ (send n*-turning :nt+)))
                  (if (and (not (null n*t+))
                           (= (send turning :sign) (send n*t+ :sign)))
                      (send turning set-n* n*t+)
                      (send turning set-n* nil)))
                ;TURNING is above N*-TURNING so consider the next highest one:
                (let ((n*t- (send n*-turning :nt-)))
                  (if (and (not (null n*t-))
                           (= (send turning :sign) (send n*t- :sign)))
                      (send turning set-n* n*t-)
                      (send turning set-n* nil)))
                ;N.B. The case of TURNING having the same time as N*-TURNING is
                ;treated as the "above" case.  It would be better to pick the
                ;nearest of N*T+ and N*T-, as in the original implementation.
                )))))

(defmethod (amos :PRUNE-ACCORDING-TO-MUTUAL-NEAREST-NEIGHBOR-CRITERION) ()
  "Sets NX/Y/+/- pointers to NIL if they are not in the mutual nearest
   neighbor relation."
  (loop with (xdim ydim) = (array-dimensions Turnings)
        for x from 0 below xdim do
        (loop for y from 0 below ydim do
              (loop for turning in (aref Turnings x y) do
                    (send self :prune-according-to-mnn-directionally
                          turning :nx+ :set-nx+ :nx-)
```

```
              (send self :prune-according-to-mnn-directionally
                    turning :nx- :set-nx- :nx+)
              (send self :prune-according-to-mnn-directionally
                    turning :ny+ :set-ny+ :ny-)
              (send self :prune-according-to-mnn-directionally
                    turning :ny- :set-ny- :ny+)))))

(defmethod (amos :PRUNE-ACCORDING-TO-MNN-DIRECTIONALLY)
           (turning n*a set-n*a n*b)
  "Prunes the N*A pointer of TURNING if it does not point to a turning
in the mutual nearest neighbor relation with TURNING."
    (if (and (not (null (send turning n*a)))
             (not (eq turning (send (send turning n*a) n*b))))
        (send turning set-n*a nil)))

(defmethod (amos :APPLY-LOW-CURVATURE-CRITERION) ()
  "Scans all pairings, removing those that violate the low curvature
criterion."
  (loop with (xdim ydim) = (array-dimensions Turnings)
        for x from 0 below xdim do
        (loop for y from 0 below ydim do
              (loop for turning in (aref Turnings x y) do
                    (send self :prune-according-to-low-curvature-directionally
                          turning :nx- :set-nx- :nx+ :set-nx+)
                    (send self :prune-according-to-low-curvature-directionally
                          turning :ny- :set-ny- :ny+ :set-ny+)))))

(defmethod (amos :PRUNE-ACCORDING-TO-LOW-CURVATURE-DIRECTIONALLY)
           (turning n*- set-n*- n*+ set-n*+)
  "Prunes the incident pairings in the * direction if the change in dip
between the two pairings is greater than D. Dip is computed in the
(X, Y, Time) space where traces are spaced at unit intervals in the X
and Y directions and Time is measured in sample points. It would be
more appropriate to compute dip using the actual trace intervals (in
meters) and the true times (in milliseconds)."
  (let ((turning-n*- (send turning n*-))
        (turning-n*+ (send turning n*+)))
    (cond
      ((and (not (null turning-n*-))
            (not (null turning-n*+))
            (> (abs (- (- (send turning :time) (send turning-n*- :time))
                       (- (send turning-n*+ :time) (send turning :time))))
               D))
       (send turning-n*- set-n*+ nil)
       (send turning     set-n*- nil)
       (send turning     set-n*+ nil)
       (send turning-n*+ set-n*- nil)))))

(defmethod (amos :APPLY-3D-CONTINUITY-CRITERION) ()
  "Scans all pairings, removing those that violate the three-dimensional
continuity criterion."
  (loop with (xdim ydim) = (array-dimensions Turnings)
        for x from 0 below xdim do
        (loop for y from 0 below ydim do
              (loop for turning in (aref Turnings x y) do
                    (send self :prune-according-to-3d-continuity-directionally
                          turning :nx+ :set-nx+ :nx- :set-nx- :ny+ :ny-)
                    (send self :prune-according-to-3d-continuity-directionally
                          turning :ny+ :set-ny+ :ny- :set-ny- :nx+ :nx-))
              )))

(defmethod (amos :PRUNE-ACCORDING-TO-3D-CONTINUITY-DIRECTIONALLY)
           (turning na+ set-na+ na- set-na- nb+ nb-)
  "Eliminates the NA+ pairing of TURNING if the pairing is not part of
a local loop on either side (in the B+ or B- direction) of the pairing."
  (cond
    ((and (not (null (send turning na+)))
          (not (or (send self :local-loop-ties-p turning na+ nb+ na- nb-)
                   (send self :local-loop-ties-p turning na+ nb- na- nb+))))
     (send (send turning na+) set-na- nil)
     (send turning set-na+ nil))))

(defmethod (amos :LOCAL-LOOP-TIES-P) (turning &rest n*i)
  "Returns T iff TURNING is reached by following the four n*i pointers,
starting from TURNING."
  (loop for n* in n*i
        for current-turning first (send turning n*)
                            then (send current-turning n*)
```

```
              until (null current-turning)
              finally (return (eq turning current-turning)))))

#|========================================================================
                    STEP 3:   EXTRACT HORIZONS
========================================================================|#

(defmethod (amos :EXTRACT-HORIZONS) ()
  "Collects turnings connected by the pairings determined in Step 2 into
  horizons, constructing the Horizons representation."
  (loop with (xdim ydim) = (array-dimensions Turnings)
        for x from 0 below xdim do (loop for y from 0 below ydim do
              (loop for turning in (aref Turnings x y)
                    if (and (null (send turning :horizon))
                            (or (not (null (send turning :nx+)))
                                (not (null (send turning :nx-)))
                                (not (null (send turning :ny+)))
                                (not (null (send turning :ny-)))))
                    do (send self :extract-horizon turning)))))

(defmethod (amos :EXTRACT-HORIZON) (turning)
  "Collects turnings connected to TURNING by the pairings determined
  in Step 2 into a horizon array and adds it to Horizons."
  (let ((horizon (make-array (firstn 2 (array-dimensions Data)) :type 'art-q)))
    (send self :add-turning-to-horizon turning horizon)
    (push horizon Horizons)))

(defmethod (amos :ADD-TURNING-TO-HORIZON) (turning horizon)
  "If TURNING is not already part of a horizon and HORIZON does not already
  have a turning at the (X,Y) position of TURNING (enforcing the Vertical
  Uniqueness criterion), then TURNING is added to HORIZON and all turnings
  paired with TURNING are added to HORIZON (using the Transitivity of the
  Pair Relation criterion)."
  (cond
    ((and (not (null turning))
          (null (send turning :horizon))
          (null (aref horizon (send turning :x) (send turning :y))))
     (send turning :set-horizon horizon)
     (aset turning horizon (send turning :x) (send turning :y))
     (send self :add-turning-to-horizon (send turning :nx+) horizon)
     (send self :add-turning-to-horizon (send turning :nx-) horizon)
     (send self :add-turning-to-horizon (send turning :ny+) horizon)
     (send self :add-turning-to-horizon (send turning :ny-) horizon))))

#|========================================================================
                    STEP 4:   DISPLAY HORIZONS
========================================================================|#

(defmethod (amos :DISPLAY-HORIZONS) (&optional (attribute :time))
  "Displays color maps of the Horizons, one by one, in Window.  The
  ATTRIBUTE values, :TIME or :AMPLITUDE, are indicated by color.  After
  each display the program waits for any character to be typed before
  proceeding to map the next horizon."
  (if (null Amplitude-Bins)
      (send self :compute-amplitude-bins-for-data))
  (loop for horizon in Horizons do
        (send Window :clear-screen)
        (send self :display-horizon horizon attribute)
        (tyi)))

(defvar 4-BIT-COLORS)   ;ART-Q-16 of ART-4B-8-1's; colors 0:15 respectively.
(defvar 1-BIT-COLORS)   ;ART-Q-16 of ART-1B-32-4's; B&W patterns for colors 0:15.

(defmethod (amos :DISPLAY-HORIZON) (horizon attribute)
  "Displays a color map of the ATTRIBUTE of HORIZON in Window.  If ATTRIBUTE is
  :AMPLITUDE all amplitudes lying within the same Amplitude-Bin (defined by
  :COMPUTE-AMPLITUDE-BINS-FOR-DATA) are displayed in the same color.  If
  ATTRIBUTE is :TIME the time range of the horizon is divided into fourteen
  equal color bins.  The (X=0,Y=0) corner of the map appears in the lower-left
  corner of the window.  The X axis is horizontal and the Y axis is vertical."
  (if (eq attribute :time)
      (send self :compute-time-bins-for-horizon horizon))
  (multiple-value-bind (width height) (send window :inside-size)
    (tv:prepare-sheet (window)
```

```
(loop with screen = (tv:sheet-screen-array window)
      and left = (tv:sheet-inside-left window)
      and top = (tv:sheet-inside-top window)
      and (hxdim hydim) = (array-dimensions horizon)
      with pixel-width = (max 1 (// width hxdim))
      and pixel-height = (max 1 (// height hydim))
      with wxmax = (+ left (* pixel-width (- (min hxdim width) 1)))
      and wymax = (+ top (* pixel-height (- (min hydim height) 1)))
      with colors = (if (eq 'art-1b (array-type screen))
                        1-bit-colors 4-bit-colors)
      with alu = tv:alu-ior
      for wy* from top to wymax by pixel-height
      for wy from wymax by (- pixel-height)
      for hy from 0 by 1 do
      (loop for wx from left to wxmax by pixel-width
            for hx from 0 by 1
            for turning = (aref horizon hx hy)
            if (not (null turning))
              do (bitblt alu pixel-width pixel-height
                         (aref colors (send self :color-for-turning
                                             turning attribute))
                         0 0
                         screen wx wy))))))

(defmethod (amos :COMPUTE-AMPLITUDE-BINS-FOR-DATA) ()
  "Sets Amplitude-Bins to a list of numbers defining fourteen divisions of the
amplitude range of Data. The first seven bins represent negative amplitudes
and the other seven span the postive amplitudes."
  (loop with (xdim ydim tdim) = (array-dimensions Data)
        and  min-amplitude = 1e34
        and  max-amplitude = -1e34
        for x from 0 below xdim do
        (loop for y from 0 below ydim do
              (loop for time from 0 below tdim
                    for amplitude = (aref Data x y time) do
                    (if (< amplitude min-amplitude)
                        (setq min-amplitude amplitude))
                    (if (> amplitude max-amplitude)
                        (setq max-amplitude amplitude))))
        finally
        (setq Amplitude-Bins
          `(-1e34
            ,@(loop with bin-width = (// (- 0 min-amplitude) 6.0)
                    repeat 6 for bin from (+ min-amplitude bin-width) by bin-width
                    collect bin)
            0
            ,@(loop with bin-width = (// (- max-amplitude 0) 6.0)
                    repeat 6
                    for bin from (+ 0 bin-width) by bin-width
                    collect bin)
            1e34))))

(defmethod (amos :COMPUTE-TIME-BINS-FOR-HORIZON) (horizon)
  "Sets Time-Bins to a list of numbers defining fourteen equal divisions of
the time range of HORIZON. Time values are negated so that time zero is
assigned the largest color number. Thus the time color maps are analogous
to elevation maps: structural highs of horizons are assigned larger color
numbers than structural lows."
  (loop with (xdim ydim) = (array-dimensions horizon)
        and  min-time = 1e34
        and  max-time = -1e34
        for x from 0 below xdim do
        (loop for y from 0 below ydim
              for turning = (aref horizon x y)
              if (not (null turning))
                do (let ((time (- (send turning :time))))
                     (if (< time min-time) (setq min-time time))
                     (if (> time max-time) (setq max-time time))))
        finally
        (setq Time-Bins
          `(-1e34
            ,@(loop with bin-width = (// (- max-time min-time) 13.0)
                    repeat 13
                    for bin from (+ min-time bin-width) by bin-width
                    collect bin)
            1e34))))
```

```
(defmethod (amos :COLOR-FOR-TURNING) (turning attribute)
  "Returns a color (bin number) for the ATTRIBUTE of TURNING."
  (multiple-value-bind (t0 t1 t2 t3 t4 t5 t6 t7 t8 t9 t10 t11 t12 t13 t14)
      (values-list (selectq attribute
                    (:amplitude Amplitude-Bins)
                    (:time Time-Bins)))
    (let ((attribute-value (send turning attribute)))
      (if (eq attribute :time)
          ;Negate time so structural highs have largest color values:
          (setq attribute-value (- attribute-value)))
      ;Hard-coded binary search for the corresponding attribute-value bin:
      (if (>= attribute-value t7)
          (if (>= attribute-value t11)
              (if (>= attribute-value t13)
                  (if (>= attribute-value t14) 15 14)
                  (if (>= attribute-value t12) 13 12))
              (if (>= attribute-value t9)
                  (if (>= attribute-value t10) 11 10)
                  (if (>= attribute-value t8)   9  8)))
          (if (>= attribute-value t3)
              (if (>= attribute-value t5)
                  (if (>= attribute-value t6)   7  6)
                  (if (>= attribute-value t4)   5  4))
              (if (>= attribute-value t1)
                  (if (>= attribute-value t2)   3  2)
                  (if (>= attribute-value t0)   1  0)))))))

;The remaining variables and functions support the :DISPLAY-HORIZONS method.

(defvar 1-BIT-COLORS-SPECIFICATION
  '((#o0000 #o0000 #o0000 #o0000)           ;0  1-bits (all white); background color.
    (#o1111 #o1111 #o1111 #o1111)           ;15 1-bits (nearly all black).
    (#o1011 #o1110 #o1111 #o1111)           ;14
    (#o1011 #o1110 #o0111 #o1111)           ;13
   ;(#o1011 #o1110 #o0111 #o1101)           ;12 (Chosen to be left out.)
    (#o1010 #o1110 #o0111 #o1101)           ;11
    (#o0010 #o1110 #o0111 #o1101)           ;10
    (#o0010 #o1110 #o0111 #o0101)           ;9
    (#o0010 #o1110 #o0111 #o0100)           ;8
    (#o0000 #o1110 #o0111 #o0100)           ;7
    (#o0000 #o0110 #o0111 #o0100)           ;6
    (#o0000 #o0110 #o0111 #o0000)           ;5
    (#o0000 #o0110 #o0110 #o0000)           ;4
    (#o0000 #o0010 #o0110 #o0000)           ;3
    (#o0000 #o0000 #o0110 #o0000)           ;2
    (#o0000 #o0000 #o0010 #o0000)           ;1  1-bit (nearly all white).
    (#o1111 #o1111 #o1111 #o1111)))         ;16 1-bits (all black); outlining color.

(defun CREATE-4-BIT-COLORS ()
  (setq 4-bit-colors (make-array '(16) :type 'art-q))
  (loop for color from 0 to 15
        for array = (make-array '(8 1) :type 'art-4b) do
        (loop for i from 0 to 7 do (aset color array i 0))
        (aset array 4-bit-colors color)))

(defun CREATE-1-BIT-COLORS ()
  (setq 1-bit-colors (make-array '(16) :type 'art-q))
  (loop for color from 0 to 15
        for 1-bit-color in 1-bit-colors-specification
        for array = (call #'tv:make-gray () 4 () 4 :spread 1-bit-color) do
        (aset array 1-bit-colors color)))

(eval-when (load eval)
  (create-4-bit-colors)
  (create-1-bit-colors))

#|================================================================
                  Convenience Functions for System Use
 ================================================================|#

(defvar *AMOS-INSTANCES* nil)   ;List of all instances of AMOS during a session.

(defun APPLY-AMOS-METHOD
```

```
(&optional (data nil) (window terminal-io) (n 1) (d 0.5))
"Applies the Amos method to DATA, displaying the resulting time structure
maps in WINDOW. If DATA is NIL, a 3D array of hypothetical data is used
(obtained via CREATE-SEISMIC-DATA-ARRAY)."
(let ((amos (make-instance 'amos
                  :data (if (null data) (create-seismic-data-array) data)
                  :window window
                  :n n
                  :d d)))
  (push amos *amos-instances*)
  (send amos :compute-horizons)))

(defun CREATE-SEISMIC-DATA-ARRAY
       (&optional (x-dim 10) (y-dim 10) (time-dim 20)
         (trace-generation-function #'sin)
         (dip-generation-function #'dome-generation-function))
  "Returns an array of hypothetical seismic data suitable for Data in the AMOS
flavor. This function is not part of the Amos method. TRACE-GENERATION-
FUNCTION is a function of Time that defines the form of every trace.
DIP-GENERATION-FUNCTION is a function of X and Y that defines the offset of
the starting point of each trace from zero."
  (loop with array = (make-array (list x-dim y-dim time-dim) :type 'art-q)
        for x below x-dim do
        (loop for y below y-dim do
              (loop for time below time-dim do
                    (aset (funcall trace-generation-function
                             (+ time
                                (funcall dip-generation-function x y)))
                          array x y time)))
        finally (return array)))

(defun DOME-GENERATION-FUNCTION (x y)
  "Defines a dome-like structure that peaks at (X=4,Y=6), suitable for use with
CREATE-SEISMIC-DATA-ARRAY."
  (* -0.1 (sqrt (+ (* (- x 4) (- x 4))
                   (* (- y 6) (- y 6))))))
```

What is claimed is:

1. A computer system for reviewing and modifying horizons of a three-dimensional seismic volume, the horizons being defined by a network of points, wherein paths interconnecting the points may each have a curvature in the vertical direction (time) over a distance in the X or Y horizontal directions; comprising:
   (a) means for assessing the curvature of each of the paths of points of the network in both the X and Y directions;
   (b) means for determining whether the curvature exceeds a threshold value for each of the paths of points; and
   (c) means for terminating any of the paths at the point where the curvature exceeds the threshold value.

2. The system of claim 1 wherein the points comprise turnings.

3. The system of claim 2 further comprising:
   (d) means for detecting whether a pair of turnings is a link in a closed loop of turnings and for rejecting any pair of turnings that does not constitute a link in a closed loop.

4. The system of claim 2 wherein the means for assessing comprises means for successively measuring the slope (m1) of the segment between a turning and a preceding turning, and the slope (m2) of the segment between the turning and a succeeding turning.

5. The system of claim 3 wherein the means of assessing comprises means for successively measuring the slope (m1) of the segment between a turning and a preceding turning, and the slope (m2) of the segment between the turning and a succeeding turning.

6. The system of claim 4 wherein the means for determining comprises means for measuring the difference between slopes m1 and m2.

7. The system of claim 5 wherein the means for determining comprises means for measuring the difference between slopes m1 and m2.

8. The system of claim 6 wherein the means for terminating comprises means for comparing the difference with a predetermined value and for rejecting the segments if the difference exceeds the predetermined value.

9. The system of claim 7 wherein the means for terminating comprises means for comparing the difference with a predetermined value and for rejecting the segments if the difference exceeds the predetermined value.

10. The system of claim 3 wherein the closed loop comprises four turnings forming four pairs of turnings.

11. The system of claim 9 wherein the closed loop comprises four turnings forming four pairs of turnings.

12. The system of claim 2 further comprising display means for receiving and displaying the modified horizon.

13. The system of claim 3 further comprising display means for receiving and displaying the modified horizon.

14. A method of reviewing and modifying horizons of a three-dimensional seismic volume, the horizons being defined by a network of points wherein paths interconnecting the points may each have a curvature in the vertical direction (time) over a distance in the X or Y horizontal directions, comprising the steps of:
   (a) assessing the curvature of each of the paths of points of the network in both the X and Y direction;

(b) determining whether the curvature exceeds a threshold value for each of the paths of points; and (c) terminating any of the paths at the point where the curvature exceeds the threshold value.

15. The method of claim 14 wherein the points comprise pairs of turnings.

16. The method of claim 15 further comprising the step of:

(d) detecting whether a pair of turnings is a link in a closed loop of turnings and for rejecting any pair of turnings that does not constitute a link in a closed loop of turnings.

17. The method of claim 15 wherein the step of assessing comprises successively measuring the slope (m1) of the segment between a turning and a preceding turning, and the slope (m2) between the turning and a succeeding turning.

18. The method of claim 16 wherein the step of assessing comprises successively measuring the slope (m1) of the segment between a turning and a preceding turning, and the slope (m2) between the turning and a succeeding turning.

19. The method of claim 17 wherein the step of determining comprises measuring the difference between slopes (m1) and (m2).

20. The method of claim 18 wherein the step of determining comprises measuring the difference between slopes (m1) and (m2).

21. The method of claim 19 wherein the step of terminating comprises comparing the difference with a predetermined value and rejecting the segments if the difference exceeds the predetermind value.

22. The method of claim 20 wherein the step of terminating comprises comparing the difference with a predetermined value and rejecting the segments if the difference exceeds the predetermined value.

23. The method of claim 16 wherein the step of detecting comprises testing for a closed loop of four turnings comprising four pairs of turnings.

24. The method of claim 22 wherein the step of detecting comprises testing for a closed loop of four turnings comprising four pairs of turnings.

25. The method of claim 15 further comprising displaying the modified horizon.

26. The method of claim 16 further comprising displaying the modified horizon.

* * * * *